United States Patent
Hensley et al.

(10) Patent No.: US 6,957,796 B2
(45) Date of Patent: Oct. 25, 2005

(54) HYDRO-FORMED SEAT ADJUSTER SYSTEM

(75) Inventors: Leonard K. Hensley, Farmington Hills, MI (US); Keith McCullen, Shelby Township, Macomb County, MI (US); Michael G. Maddelein, Newcastle Circus (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/345,103

(22) Filed: Jan. 15, 2003

(65) Prior Publication Data

US 2004/0135411 A1    Jul. 15, 2004

(51) Int. Cl.$^7$ ............................................. F16M 13/00
(52) U.S. Cl. .................. 248/421; 297/344.15; 297/330
(58) Field of Search ........................ 297/344.15, 330, 297/339; 403/383; 248/421

(56) References Cited

U.S. PATENT DOCUMENTS

| | | | |
|---|---|---|---|
| 4,913,268 A * | 4/1990 | Parker et al. .......... 188/322.19 |
| 4,924,584 A * | 5/1990 | Harney ........................ 29/509 |
| 5,014,958 A | 5/1991 | Harney | |
| 5,175,913 A * | 1/1993 | Mackie et al. ................ 24/562 |
| 5,224,749 A | 7/1993 | Gauger et al. | |
| 5,344,114 A | 9/1994 | Rees | |
| 5,499,788 A | 3/1996 | Rees | |
| 5,564,785 A | 10/1996 | Schultz et al. | |
| 5,630,334 A | 5/1997 | Ash | |
| 5,769,499 A * | 6/1998 | Dudash et al. ......... 297/452.18 |
| 5,845,382 A | 12/1998 | Schultz et al. | |
| 5,871,195 A | 2/1999 | Gauger | |
| 5,899,428 A | 5/1999 | Gauger | |
| 5,924,668 A | 7/1999 | Garrido | |
| 5,988,756 A | 11/1999 | Aufrere et al. | |
| 6,095,475 A * | 8/2000 | Willms et al. .............. 248/421 |
| 6,282,790 B1 | 9/2001 | Jackel et al. | |
| 6,352,311 B1 | 3/2002 | Hayotte | |
| 6,435,613 B1 * | 8/2002 | Kupietz ...................... 297/338 |
| 2002/0060489 A1 | 5/2002 | Richard | |
| 2002/0073526 A1 | 6/2002 | Mason et al. | |
| 2002/0084683 A1 | 7/2002 | Christopher | |

OTHER PUBLICATIONS http://www.gtd.com/liquid-impact.html, one page document entitled "Liquid Impact Forming," 2000.

Seat Adjuster Drawing (believed to have been offered for sale prior to Jan. 15, 2003).

\* cited by examiner

*Primary Examiner*—Milton Nelson, Jr.
(74) *Attorney, Agent, or Firm*—Brooks Kushman P.C.

(57) ABSTRACT

A seat adjuster system includes a shaft and an elongated member. In another aspect of the present invention, the member is a lever which is attached to the shaft by an interference fit. A further aspect of the present invention employs hydro-forming of the shaft to attach the member to the shaft, which is preferably a torsion tube for an automotive seat.

8 Claims, 3 Drawing Sheets

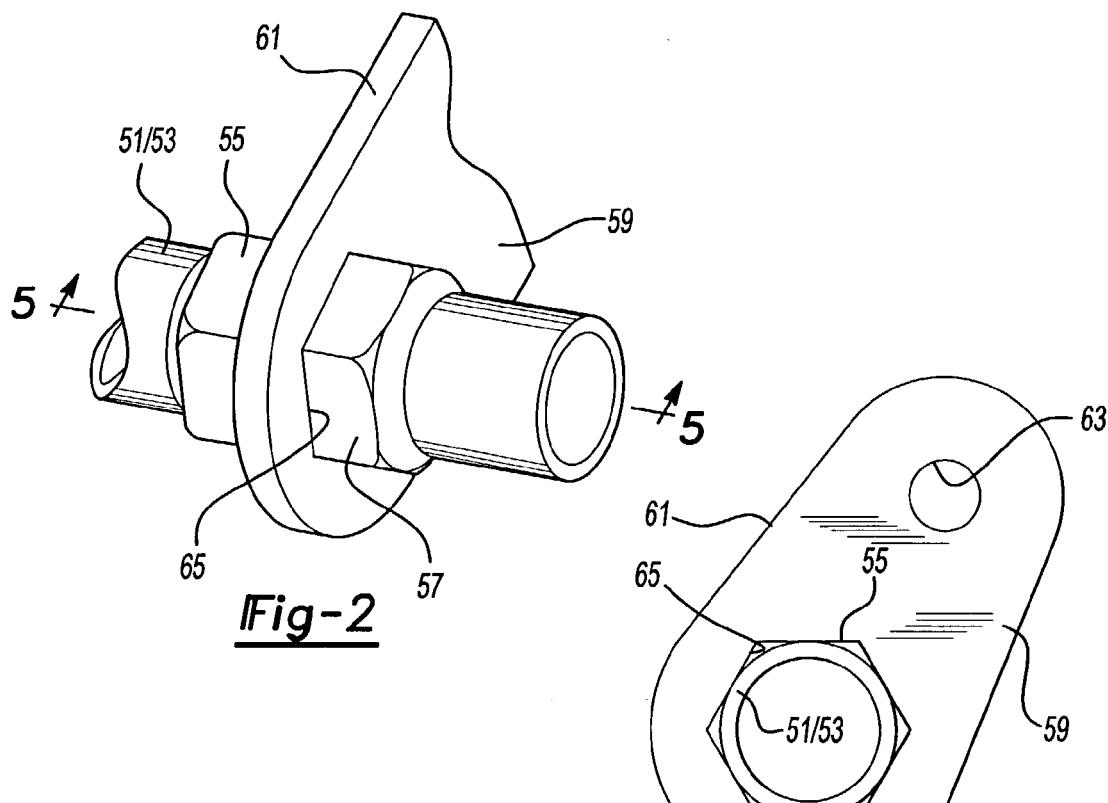
Fig-2
Fig-3
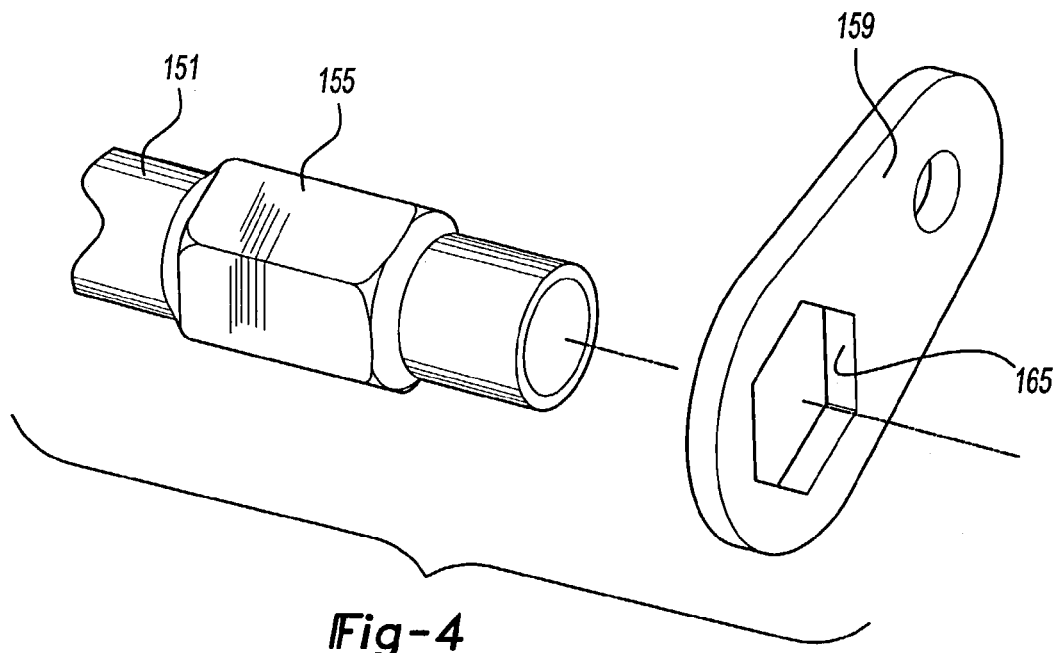
Fig-4

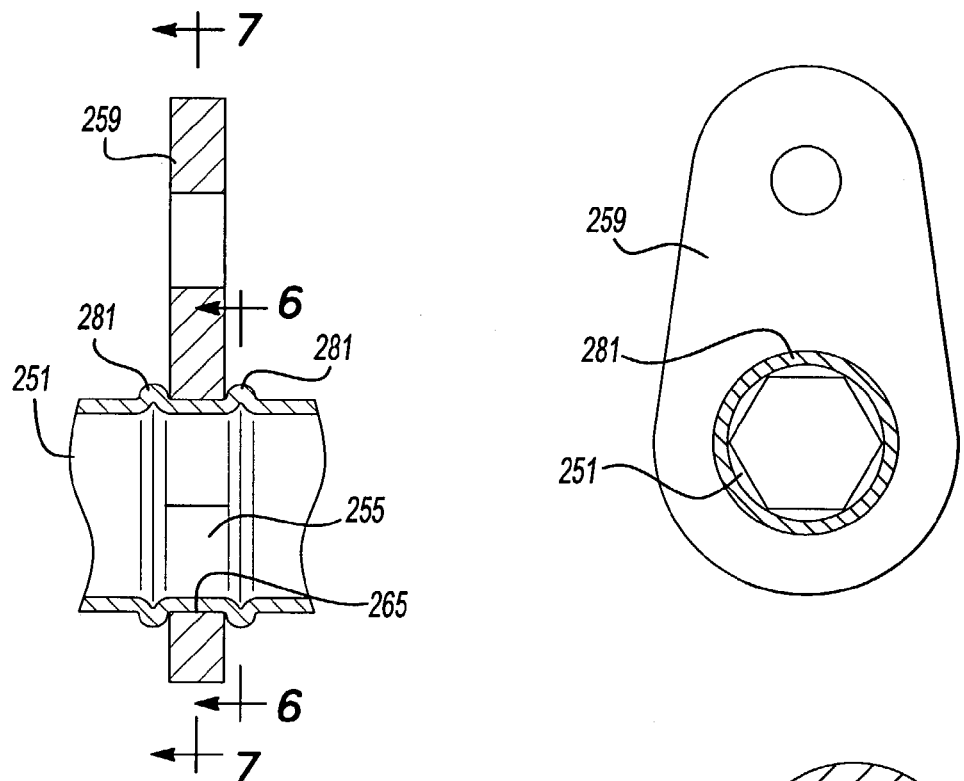
Fig-5
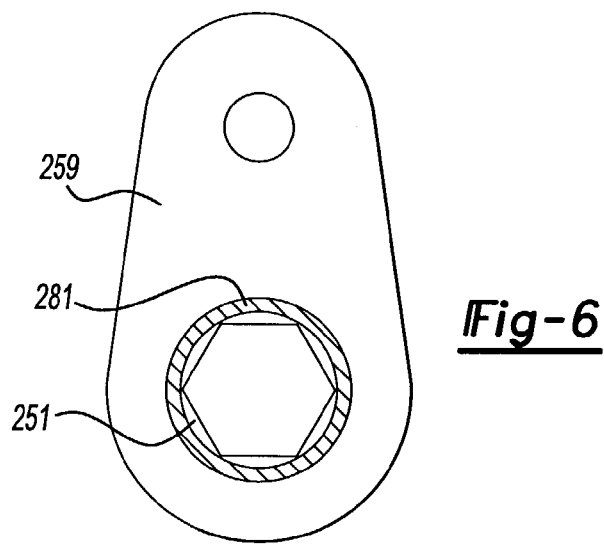
Fig-6
Fig-7
Fig-8
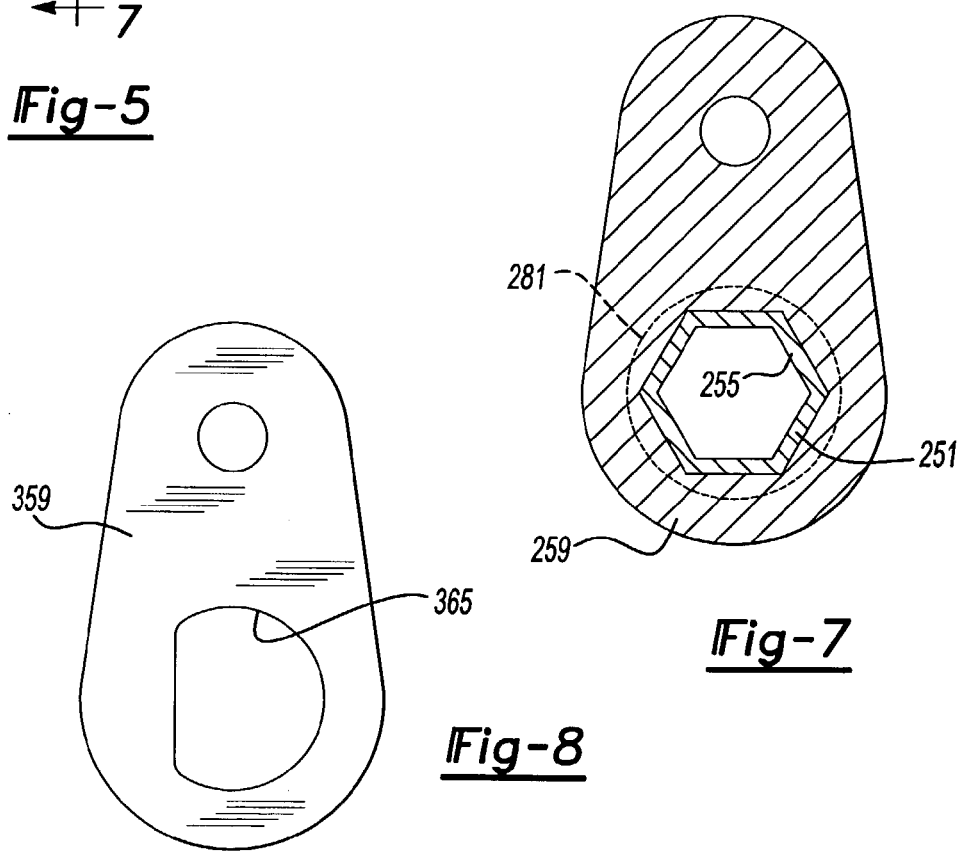

HYDRO-FORMED SEAT ADJUSTER SYSTEM

BACKGROUND OF THE INVENTION

The present invention relates generally to seats and more specifically to a hydro-formed seat adjuster system.

It is well known in the automotive vehicle seating industry to employ seat adjusters which carry a seat support frame upon which are mounted a seat bottom cushion and a seat back cushion. The seat adjusters can be manually operated or automatically driven by electric motor actuators. Many traditional power seat actuators employ a front torsion tube and a rear torsion tube. Motion links are typically fusion welded onto each torsion tube. These torsion tubes control lifting and tilting of the seat adjuster, seat frame and cushions. One such conventional assembly is disclosed within U.S. Pat. No. 5,899,428 entitled "Vehicle Power Seat Adjuster with Self-Locking Track Assemblies" which issued to Gauger on May 4, 1999, which is incorporated by reference herein.

SUMMARY OF THE INVENTION

In accordance with the present invention, a seat adjuster system includes a shaft and an elongated member. In another aspect of the present invention, the member is a lever which is attached to the shaft by an interference fit. A further aspect of the present invention employs hydro-forming of the shaft to attach the member to the shaft, which is preferably a torsion tube for an automotive seat. A method of making a seat is also provided.

The seat adjuster system of the present Invention is advantageous over traditional constructions in that the hydro-formed, interference fit between the member and the shaft of the present invention creates a dimensionally and structurally enhanced and stable assembly. The present invention thereby improves quality, manufacturing repeatability and usage durability while not requiring the conventional welding process which can have processing consistency issues and can be more expensive. Additional advantages and features of the present invention will become apparent from the following description and appended claims, taken in conjunction with the accompanying drawings.

BRIEF DESCRIPTION OF THE DRAWINGS

FIG. 2 is a fragmentary perspective view of a torsion tube and lever employed in the preferred embodiment system;

FIG. 3 is a diagrammatic end view showing the torsion tube and lever employed in the preferred embodiment system, but having a generic or simplified outside edge shape;

FIG. 4 is a fragmentary and exploded, perspective view showing a torsion tube and lever employed in a first alternate embodiment of the present invention system;

FIG. 5 is a longitudinal sectional view, taken along line 5—5 of FIG. 2, showing a torsion tube and lever employed in a second alternate embodiment of the present invention system;

FIG. 6 is a cross sectional view, taken along line 6—6 of FIG. 5, showing the torsion tube and lever employed in the second alternate embodiment system;

FIG. 7 is a cross sectional view, taken along line 7—7 of FIG. 5, showing the torsion tube and lever employed in the second alternate embodiment system; and FIG. 8 is an end elevational view, like that of FIG. 3, showing a lever employed in a third alternate embodiment of the present invention system.

DETAILED DESCRIPTION OF THE PREFERRED EMBODIMENT

Figure 1:
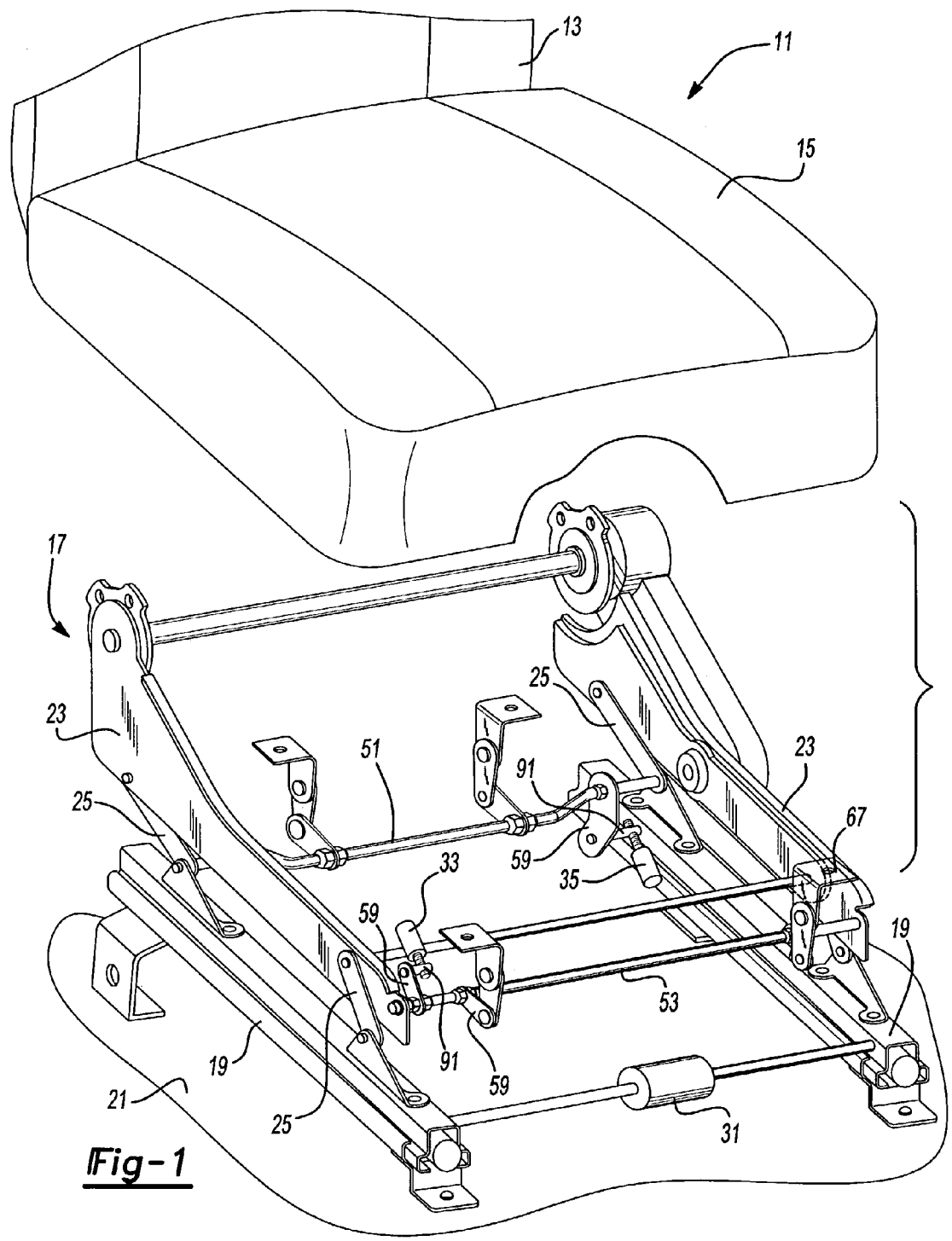
FIG. 1 is a partially exploded perspective view showing the preferred embodiment system of the present invention.

Referring to FIG. 1, a seat 11 includes a seat back cushion 13 mounted to a seat back frame (not shown), a seat bottom cushion 15 mounted to a seat bottom frame (not shown), and the preferred embodiment of a seat adjuster system 17 of the present invention. Seat adjuster system 17 includes a pair of fore-and-aft elongated seat tracks 19 which are fastened to a floor pan 21 of an automotive vehicle. A pair of upstanding adjustment rail assemblies 23 are each secured to the corresponding seat track 19 by way of links 25. A first automatically powered actuator 31, preferably a fractional horsepower and direct current electric motor, operably drives one portion of the seat track relative to another portion of the seat track to provide fore-and-aft linear movement of the seat. A second automatically powered actuator 33, preferably a fractional horsepower and direct current electric motor, provides front tilting and lifting motion to the seat. A third automatically powered actuator 35, preferably a fractional horsepower and direct current electric motor, operably causes rear tilting and lifting of the seat. Vertical seat lifting motion is caused by simultaneous coordinated movement of second and third motor actuators 33 and 35.

A hollow steel, rear torsion tube 51 and a hollow steel, front torsion tube 53 are elongated in a cross-car direction. Rear torsion tube 51 is a shaft having end segments joined by an offset central segment with bent segments connecting the central segment to the end segments. Ends of rear torsion tube 51 are connected to the corresponding links 25. Front torsion tube 53 is essentially a straight shaft with ends connected to adjustment rail assemblies 23.

Referring now to FIGS. 1–3, each torsion tube 51/53 has a pair of connecting sections 55 which are enlarged and outwardly bulging beyond the adjacent sections on either side thereof. The bulged connecting sections 55 of each torsion tube 51/53, as well as the offset and bent segments in rear torsion tube 51, are created by a liquid impact forming process, generally defined herein as "hydroforming," such as that disclosed throughout U.S. Pat. No. 5,630,334 entitled "Liquid Impact Tool Forming Mold" and issued to Ash on May 20, 1997, which is incorporated by reference herein. In summary, the hydro-forming process desired fills a torsion tube 51/53 with a liquid at approximately atmospheric pressure, and the torsion tube is then die-stamped to form the offset and bent segments relative to the nominal end segments (or vice versa). Simultaneously or in a subsequent step, the liquid inside the tube expands the segment of the tube corresponding to each connecting section 55 through internal fluid pressure. Accordingly, the peripheral surface of torsion tube 51/53 at each connecting section 55 conforms to an interior surface of the die cavity containing the tube and/or a lever as will be discussed in more detail hereinafter. With the present invention, the preferred peripheral shape of each connecting section 55 is a hexagon; in other words, a six sided polygon with each side defining a flat 57. The nominal peripheral shape of the adjacent torsion tube 51/53 has circular-cylindrical outside diameter and inside diameter shapes. It should be appreciated that alternate hydro-forming and stamping processes can be used.

Six lever or link members 59 are stamped from one or more sheets of steel and are elongated generally along a fore-and-aft, vertical plane when installed in the vehicle. There are preferably three such levers 59 secured to each torsion rod although it is alternately envisioned that more or less can be employed and that they may have differing shapes from those shown; for example each lever may alternately have an L-shape, camming shape, or even a U-shape with coaxial apertures connected to a tube. Lever 59 (the shape of which is generically shown in FIG. 3) has a peripheral edge 61, an aperture 65 and a distal end surrounding a fastening hole 63. Aperture 65 and hole 63 are pierced within lever 59 with aperture 65 having an internal edge defined by six flat polygonal sides. After manufacturing the levers, each lever 59 is inserted into the hydroforming die such that aperture 65 surrounds connecting segment 55 which is still in its initial circular-cylindrical shape. The levers are secured in their desired position by the die or a cooperating fixture relative to the torsion tubes. Subsequently, the hydro-forming process is used to expand connecting segment 55 wherein a very tight mating, interference fit is created between the portion of connecting section 55 that contacts against aperture 65 of lever 59. Thus, no welding is required with the presently preferred embodiment in order to maintain a very dimensionally stable and repeatable quality attachment between torsion tubes 51 and 53, and levers 59.

For one lever 59 on each torsion tube, an output screw gear of the corresponding motor 33 or 35 (see FIG. 1) is coupled to hole 63 of the adjacent lever 59 by way of a pivotally coupled intermediate driving link 91 which has a threaded nut portion enmeshed with and linearly riding along the screw gear of the motor. Thus, linear fore-and-aft movement of driving link 91 causes rotation of the coupled lever 59 along a vertical and fore-and-aft plane which, in turn, rotates torsion tube 51/53. Rotation of torsion tube 51/53 causes simultaneous rotation of the other two levers 59 attached thereto which, raises an inverted L-shaped bracket 67 and a middle link. Each bracket 67 couples hole 63 of lever 59 to the seat bottom frame. This achieves seat tilting and/or lifting/lowering. It is alternately envisioned that the second and third electric motors can be rotated ninety degrees and other gear and/or linkage constructions may be used to drive the lever.

A first alternate embodiment system of the present invention is shown in FIG. 4. In this embodiment, torsion tube 151, which can be either the front or rear torsion tube, is hydro-formed in a manner where a connecting section 155 has polygonal flats preformed through hydro-forming prior to installation of a lever 159. Accordingly, after torsion tube 151 is removed from the forming die, an insertion fixture pushes lever 159 onto an end of torsion tube 151 in a press-fit manner. Thus, a matching polygonal aperture 165 of lever 159 surrounds connecting section 155 and is secured midway thereon by a very tight interference fit without welding.

A second alternate embodiment of the seat adjuster system of the present invention is illustrated in FIGS. 5–7. In this embodiment, a torsion tube 251, which can be either the front or rear torsion tube, has a circular-cylindrical outside and inside diameter and is placed in a hydro-forming die. Thereafter, a lever 259, having a six sided (or other number) polygonal pierced aperture 265, is loosely inserted to surround a connecting section 255 of torsion tube 251. The die or an associated fixture firmly secures lever 259 relative to torsion tube 251 and torsion tube 251 is then given its desired bent shape and the like by way of hydro-forming with or without cold stamping. Simultaneously, annular bulged and enlarged rings 281 are created through the hydro-forming process adjacent both faces of lever 259 while the internal diameter and outside diameter of torsion tube 251, at connecting section 255, is outwardly forced into a polygonal shape tightly corresponding and mating with internal aperture 265 of lever 259. The attached parts are subsequently removed from the die for further assembly to the remainder of the seat adjuster system.

Finally, a third alternate embodiment of the seat adjuster system of the present invention is shown in FIG. 8. In this embodiment, an internal aperture 365 of a lever 359 and the corresponding connecting section of a torsion tube (not shown) can have various other patterns and shapes such as the D-shape shown with a single flat. It is also envisioned that knurl or radial groove patterns can be employed instead of flats as long as sufficient mechanical interlocking occurs to minimize rotation of the lever relative to the torsion tube. While various materials have been disclosed, it should be appreciated that other materials can be readily used. It is intended by the following claims to cover these and any other departures from the disclosed embodiments which fall within the true spirit of this invention.

What is claimed is:

1. A seat adjuster system comprising:
    a fluid-formed shaft having an enlarged bulge that includes a set of external flats that extend along its length; and
    an elongated member having an aperture that includes a set of internal flats that extend completely through the aperture;
    wherein the elongated member is affixed to the shaft by engagement of each member of the set of external flats of the enlarged bulge with a corresponding member of the set of internal flats of the aperture free of welding.

2. The system of claim 1 wherein the enlarged bulge has a different peripheral shape than the adjacent sections of the shaft.

3. The system of claim 2 wherein adjacent to the enlarged bulge sections of the shaft are substantially circular-cylindrical.

4. The system of claim 1 further comprising:
    the first fluid-formed shaft having a generally linear configuration, the first fluid-formed shaft having the first and a second enlarged bulge spaced apart from each other, the second enlarged bulge each having a set of external flats;
    a second fluid-formed shaft having first and second end portions each having a generally linear configuration and an offset portion coupled to the first and second end portions by first and second bent segments, respectively, the first end portion having a third enlarged bulge and the offset portion having a fourth enlarged bulge, the third and fourth enlarged bulges each having a set of external flats; and
    second, third, and fourth elongated members each having an aperture having a set of internal flats that extend through their respective apertures;
    wherein the members of the sets of internal flats of the second, third, and fourth elongated members mate with a corresponding member of the sets of external flats of the second, third, and fourth enlarged bulges, respectively, and free of welding.

5. The system of claim 4 further comprising first and second actuators coupled to the first and third elongated members, respectively, the first actuator operably causing the first elongated member and first fluid-formed shaft to rotate and the second actuator operably causing the third elongated member and second fluid-formed shaft to rotate, thereby operably causing seat lifting and tilting motion.

6. The system of claim 1 wherein the aperture of the elongated member is an internal aperture defined by an inside edge that entirely surrounds the adjacent periphery of the shaft.

7. The system of claim 1 wherein the shaft is a hollow torsion tube made by hydro-forming and the member is a lever.

8. The system of claim 1 wherein the multiple flats of the shaft define a polygon of at least six sides.

* * * * *